United States Patent
Goujard et al.

(10) Patent No.: US 12,515,994 B2
(45) Date of Patent: Jan. 6, 2026

(54) METHOD FOR MANUFACTURING A PART OF SIC/SIC COMPOSITE MATERIAL

(71) Applicant: SAFRAN CERAMICS, Le Haillan (FR)

(72) Inventors: Stéphane Roger André Goujard, Moissy Cramayel (FR); Guillaume Jean-Nicolas Laduye, Saclay (FR); Benjamin Cossou, Moissy Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/718,161

(22) PCT Filed: Dec. 9, 2022

(86) PCT No.: PCT/FR2022/052294
§ 371 (c)(1),
(2) Date: Jun. 10, 2024

(87) PCT Pub. No.: WO2023/105176
PCT Pub. Date: Jun. 15, 2023

(65) Prior Publication Data
US 2025/0042820 A1   Feb. 6, 2025

(30) Foreign Application Priority Data
Dec. 10, 2021 (FR) .................. 2113274

(51) Int. Cl.
*C04B 35/571* (2006.01)
*C04B 35/628* (2006.01)
*C04B 35/80* (2006.01)

(52) U.S. Cl.
CPC ...... *C04B 35/571* (2013.01); *C04B 35/62868* (2013.01); *C04B 35/62884* (2013.01);
(Continued)

(58) Field of Classification Search
CPC ...... C04B 2235/428; C04B 2235/5244; C04B 2235/5252; C04B 2235/614;
(Continued)

(56) References Cited

U.S. PATENT DOCUMENTS

| 5,246,736 | A | 9/1993 | Goujard et al. |
| 5,738,951 | A | 4/1998 | Goujard et al. |

(Continued)

FOREIGN PATENT DOCUMENTS

| EP | 2933353 A1 * | 10/2015 | ........ C23C 16/045 |
| FR | 3 101 078 A1 | 3/2021 | |

(Continued)

OTHER PUBLICATIONS

International Search Report as issued in International Patent Application No. PCT/FR2022/052294, dated Mar. 27, 2023.

(Continued)

*Primary Examiner* — Shuangyi Abu Ali
(74) *Attorney, Agent, or Firm* — Pillsbury Winthrop Shaw Pittman LLP

(57) ABSTRACT

A method for manufacturing a part of SiC/SiC composite material includes the production of a fibrous preform from silicon carbide fibers; the deposition of an interphase on the fibers of the fibrous preform; a first densification including the formation of a first matrix phase by chemical vapor infiltration with a first matrix precursor including methyltrichlorosilane (MTS); a second densification including the formation of a second matrix phase by chemical vapor infiltration with a second SiC precursor different from the first precursor, the second precursor forming an SiC deposit comprising residual hydrogen and free silicon; and a third densification including the impregnation of the fibrous pre-
(Continued)

form with an impregnation composition containing at least silicon so as to obtain a part made of SiC/SiC composite material.

10 Claims, 3 Drawing Sheets

(52) U.S. Cl.
CPC ........ *C04B 35/80* (2013.01); *C04B 2235/428* (2013.01); *C04B 2235/5244* (2013.01); *C04B 2235/5252* (2013.01); *C04B 2235/614* (2013.01)

(58) Field of Classification Search
CPC ............ C04B 2235/616; C04B 35/571; C04B 35/62839; C04B 35/62863; C04B 35/62868; C04B 35/62884; C04B 35/62894; C04B 35/62897; C04B 35/80; C23C 16/0272; C23C 16/045; C23C 16/325; C23C 16/342; F01D 25/005; F05D 2300/20; F05D 2300/603; F05D 2300/6033
See application file for complete search history.

(56) References Cited

U.S. PATENT DOCUMENTS

| | | |
|---|---|---|
| 5,965,266 A | 10/1999 | Goujard et al. |
| 6,068,930 A | 5/2000 | Lamouroux et al. |
| 6,284,358 B1 | 9/2001 | Parlier et al. |
| 7,101,154 B2 | 9/2006 | Dambrine et al. |
| 7,241,112 B2 | 7/2007 | Dambrine et al. |
| 2010/0111678 A1 | 5/2010 | Habarou et al. |
| 2011/0293828 A1 | 12/2011 | Fux et al. |
| 2013/0011654 A1 | 1/2013 | Han et al. |
| 2020/0325076 A1* | 10/2020 | Mariage .................. F02K 9/97 |

FOREIGN PATENT DOCUMENTS

| | | |
|---|---|---|
| WO | WO 2010/061140 A1 | 6/2010 |
| WO | WO 2016/001026 A1 | 1/2016 |
| WO | WO 2018/002510 A1 | 1/2018 |

OTHER PUBLICATIONS

Kulik, A., et al., "Experimental study and numerical modeling of pulse CVI for the production of organomorphic C/SiC composites," International Journal of Applied Ceramic Technology, vol. 19, No. 1, Aug. 2021, XP055934567, pp. 91-100, Retrieved from the Internet: URL:https://onlinelibrary.wiley.com/doi/full-XML/10.1111/ijac.13855.

International Preliminary Report on Patentability and then Written Opinion of the International Searching Authority as issued in International Patent Application No. PCT/FR2022/052294, dated Jun. 5, 2024.

\* cited by examiner

[Fig. 1]
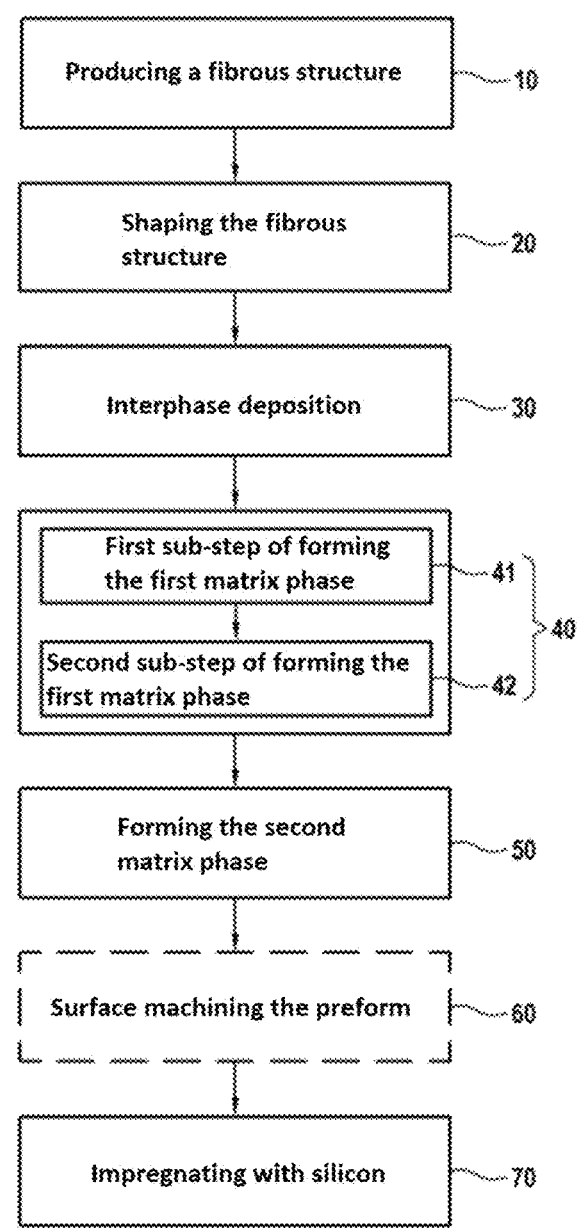

[Fig. 2]
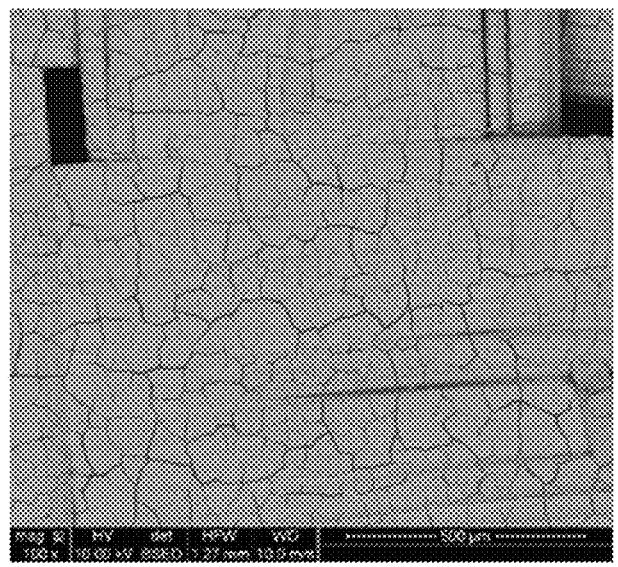
[Fig. 3]
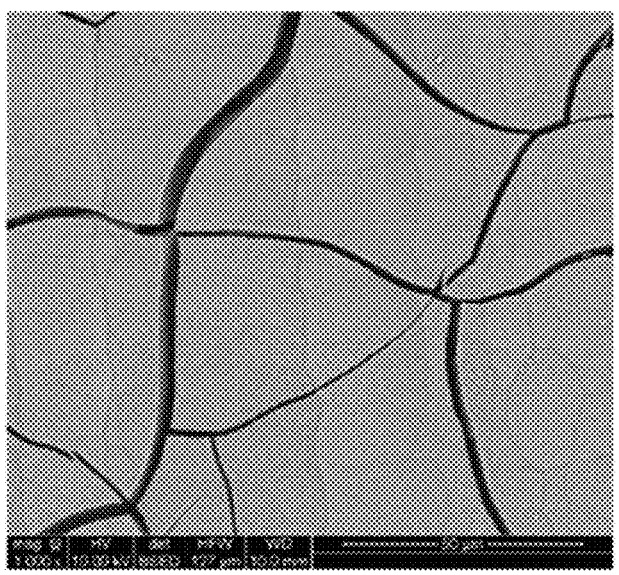

[Fig. 4]
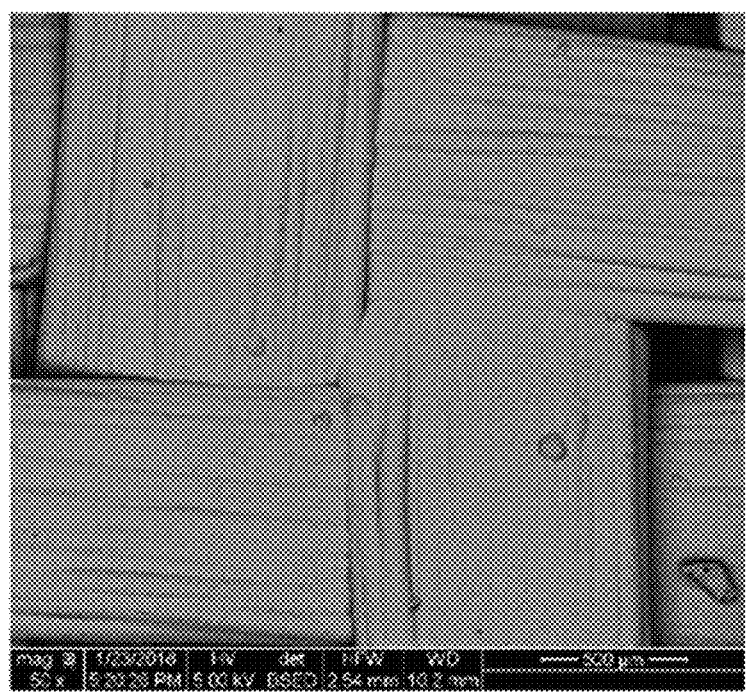

METHOD FOR MANUFACTURING A PART OF SIC/SIC COMPOSITE MATERIAL

CROSS-REFERENCE TO RELATED APPLICATIONS

This application is the U.S. National Stage of PCT/FR2022/052294, filed Dec. 9, 2022, which in turn claims priority to French patent application number 2113274 filed Dec. 10, 2021. The content of these applications are incorporated herein by reference in their entireties.

TECHNICAL FIELD

The invention concerns the manufacture of parts made of ceramic matrix composite material (CMC) and more particularly SiC/SiC composite material.

PRIOR ART

One field of application of the invention is the production of parts intended to be exposed in service to high temperatures, especially in the aeronautical and space fields, in particular parts for hot portions of aeronautical turbomachines, it being noted that the invention can be applied in other fields, for example, the field of industrial gas turbines.

CMC materials possess good thermostructural properties, i.e., high mechanical properties which make them capable of constituting structural parts and the ability to retain these properties at high temperatures.

The use of CMC materials instead of metal materials for parts exposed in service to high temperatures has therefore been recommended, especially since CMC materials have a density that is substantially lower than the metallic materials which they replace.

A well-known method for manufacturing parts from CMC material includes the following steps:
- production of a fibrous texture from carbon fibers or silicon carbide (SIC),
- consolidation of a fibrous preform by depositing an interphase on the surface of the fibers of the texture produced by chemical vapor infiltration (CVI), the fibrous texture being maintained in shaping tools during CVI,
- injection of a slurry of SiC powder into the fibrous preform ("slurry cast" or "slurry transfer molding"),
- infiltration of the preform with a composition based on molten silicon so as to form a ceramic matrix, densification process known as the MI process ("melt infiltration").

However, SiC/SiC composite material parts made with this method may have a quantity of free silicon introduced during the infiltration step which limits the thermostability of the material because silicon tends to flow from 1300° C.

The step of infiltrating the preform with a composition based on molten silicon can also lead to dispersions of mechanical characteristics in the event of incomplete infiltration and/or attack of the fibers by the molten silicon.

In addition, at the end of the infiltration stage of the preform with a composition based on molten silicon, the composite material may have a final internal porosity that is still too high compared to the desired final degree of porosity. In particular, if the slurry injected before the infiltration step is very fluid and its particle size is too small, the silicon alloy in the molten state has difficulty colonizing the entire porosity of the SiC powder.

However, there is a need to have a material with the lowest possible internal porosity and free silicon content while being resistant to attack by molten silicon during its production.

There is also a need to make it more reliable to obtain a high-performance material as well as to simplify the manufacturing range of this material.

DISCLOSURE OF THE INVENTION

To this end, the invention proposes a method of manufacturing a part made of SiC/SiC composite material comprising:
- production of a fibrous preform from silicon carbide fibers;
- deposition of an interphase on the fibers of the fibrous preform;
- a first densification step comprising the formation of a first matrix phase by chemical vapor infiltration (CVI) with a first SiC precursor comprising methyltrichlorosilane (MTS);
- a second densification step comprising the formation of a second matrix phase by chemical vapor infiltration (CVI) with a second SiC precursor different from said first precursor, the second precursor forming an SiC deposit comprising residual hydrogen and free silicon;
- a third densification step comprising the impregnation of the fibrous preform with an impregnation composition containing at least silicon so as to obtain a part made of SiC/SiC composite material.

The SiC/SiC composite material obtained with the method of the invention has a very low free silicon content typically between 5% and 10%, much lower than that of the SiC/SiC material obtained with the manufacturing method of the prior art described above (between 15% and 20%).

In addition, the SiC/SiC composite material obtained with the method of the invention comprises a much higher percentage of SiC from CVI than the SiC/SiC material of the prior art, which is favorable for its temperature resistance. This material resists attack by molten silicon during the impregnation step because the SiC produced at the beginning of the matrix from the MTS precursor is not sensitive to fragmentation, which makes it possible to protect the fibers from attack by molten silicon during the impregnation step.

The absence of SiC powder of small particle size in the matrix makes it possible to avoid the phenomena of dissolution/reprecipitation which promote attack of the fibers by the molten silicon during impregnation. The absence of introduction into the material of SiC powder, each particle of which is coated with a native layer of silica ($SiO_2$), also makes it possible to drastically reduce the duration of the cycle of impregnation with silicon by significantly reducing the duration of the deoxidation phase before impregnation, a duration that is often longer than the impregnation step itself. As a reminder, the deoxidation phase is necessary before starting any impregnation with molten silicon. In fact, it is necessary to remove any trace of silica in the material. Wetting of silicon on silica is not desirable because it does not allow the silicon to properly rise by capillary action and leads to the presence of residual porosity in the final material. The SiC from MMS is free of silica because it is obtained with a deposition process carried out in the absence of oxygen.

Moreover, the fact that SiC powder is not used to fill the porosity makes it possible to avoid frequent dispersions of properties of SiC powders which introduce a significant dispersion on the residual porosity value of the material.

According to a particular aspect of the method of the invention, the first densification step comprises a first sub-step wherein a portion of the first matrix phase is formed with the fibrous preform held in a shaping tool and a second sub-step wherein the remainder of the first phase is formed with the fibrous preform outside the shaping tool.

According to another particular aspect of the method of the invention, the second SiC precursor comprises monomethyl silane (MMS) or a mixture of silane ($SiH_4$) and ethane ($C_2H_6$) or propane ($C_3H_8$) or ethylene ($C_2H_4$).

According to another particular aspect of the method of the invention, the first densification step is carried out until the partially densified preform has a degree of porosity comprised between 40% and 25% and more preferentially between 30% and 35%.

According to another particular aspect of the method of the invention, the second densification step is carried out until the partially densified preform has a porosity comprised between 5% and 10%.

According to another particular aspect of the method of the invention, it further comprises, after the second densification step and before the third densification step, a step of heat treating the partially densified preform at a temperature below the melting temperature of the infiltration composition. The heat treatment releases the hydrogen and free silicon present in the second phase of the SiC matrix, which cracks into a multitude of fragments under the effect of contraction. This makes it possible to create in this second matrix phase a fine interconnected porosity that will promote the infiltration of silicon in the third densification step.

According to another particular aspect of the method of the invention, the method further comprises, after the second densification step and before the third densification step, machining the surface of the partially densified preform so as to reopen the porosity of the preform.

According to another particular aspect of the method of the invention, it further comprises, between the first and second densification steps, the deposition on the first matrix phase of an additional interphase of boron nitride or pyrocarbon. This interphase relaxes the stresses on the first matrix phase during the cracking of the second matrix phase during impregnation with molten silicon or during the cracking heat treatment performed before impregnation.

According to another particular aspect of the method of the invention, the second densification step is carried out with a third matrix precursor combined with the second matrix precursor, the third matrix precursor being capable of introducing hydrogen into the second matrix phase.

The method of manufacturing an SiC/SiC composite material part of the invention can especially be applied to the manufacture of a blade, a nozzle, a ring of a turbine or a gas turbine combustion chamber.

BRIEF DESCRIPTION OF THE DRAWINGS

FIG. 1 is a flowchart showing successive steps of an embodiment of a method according to the invention, FIG. 2 shows a micrograph of an SiC/SiC composite material part showing the fragmentation of an SiC matrix phase obtained by chemical vapor infiltration (CVI) with an MMS precursor, FIG. 3 is a detailed view of the micrograph in FIG. 2, FIG. 4 shows a micrograph of an SiC/SiC composite material part showing an SiC matrix phase obtained by chemical vapor infiltration (CVI) with an MTS precursor.

DESCRIPTION OF THE EMBODIMENTS

FIG. 1 shows successive steps of an embodiment of a method according to the invention for the manufacture of a part made of SiC/SiC composite material.

In a well-known manner, SiC/SiC material parts are formed by a fibrous reinforcement made of silicon carbide (SiC) fibers which is densified by a matrix at least partially made of SiC.

In step 10, a fibrous structure intended to form the fibrous reinforcement is produced from high-performance SiC fibers such as the fibers supplied by the Japanese company Nippon Carbon under the reference "Hi-Nicalon" or, preferably, under the reference "Hi-Nicalon Type-S" having a high elastic limit.

The fibrous structure is preferably obtained by three-dimensional weaving or by multilayer weaving.

"Three-dimensional weaving" or "3D weaving" means here a weaving mode by which at least some of the warp yarns bind weft yarns on several weft layers such as, for example, an "interlock weaving". "Interlock weaving" means here a 3D weaving pattern in which each warp layer connects several weft layers with all the yarns of the same warp column having the same movement in the plane of the pattern.

"Multilayer weaving" means here a 3D weaving with several weft layers whose base pattern of each layer is equivalent to a conventional 2D pattern, such as a plain, satin or twill pattern but with certain points of the pattern that connect the weft layers together.

The production of the fibrous structure by 3D or multilayer weaving makes it possible to obtain a bond between the layers, and therefore to have good mechanical strength of the fibrous structure and of the composite material part obtained, in a single textile operation.

The fibrous structure can be produced in a known manner by means of a jacquard loom on which a bundle of warp yarns or strands has been arranged in a plurality of layers, the warp yarns being bonded by layers of weft yarns or strands also arranged in a plurality of layers. A detailed example of the production of a fibrous preform intended to form the fibrous reinforcement of a blade for an aircraft engine from a 3D woven fibrous blank is especially described in detail in documents U.S. Pat. Nos. 7,101,154, 7,241,112 and WO 2010/061140. Document US 2010/111678 discloses the production of a fibrous preform by three-dimensional weaving used to form a complete CMC ring intended for use in a gas turbine.

The fibrous structure can also be produced by stacking two-dimensional layers or plies of SiC fibers.

In step 20, the fibrous structure is shaped and maintained in its shape by means of a shaping tool, in order to obtain a fibrous preform having a shape similar to that of the part to be manufactured. Examples of shaping fibrous preforms from a fibrous structure can especially be found in patent application US 2011/0293828.

While the preform is held in its shaping tool, for example made of graphite, a de-embrittlement interphase is formed in a known manner by chemical vapor infiltration or CVI on the fibers of the preform core, this interphase being especially based on boron nitride (BN) (step 30). The thickness of the interphase is preferably comprised between 10 nm and 1000 nm.

In the case of SiC fibers, a surface treatment of these fibers prior to the formation of the interphase coating can optionally be carried out to remove the sizing and a surface layer of oxide such as $SiO_2$ silica if they are present on the fibers.

In step 40, a first step of densification of the fibrous preform is carried out, comprising the formation of a first matrix phase by chemical gas infiltration (CVI) with a first SiC precursor.

This first densification step is carried out with a first gaseous SiC precursor mainly or entirely comprising methyltrichlorosilane (MTS).

The first densification step is carried out in two sub-steps. The first sub-step (sub-step 41) consists in forming part of the first matrix phase while the preform is held in the shaping tool in the CVI furnace. This first sub-step is continued until the porosity of the preform is comprised between 45% and 55%. At this stage of densification, the preform is sufficiently consolidated to be self-supporting and to be extracted from the shaping tool for subsequent steps.

The second sub-step (sub-step 42) of the first densification step is then carried out, which consists in continuing the formation of the first matrix phase by CVI with the preform outside the shaping tool.

The second sub-step which completes the first densification step is continued until the porosity of the preform is between 25% and 40% and more preferably between 30% and 35%.

The thickness of the first matrix phase is at least equal to 3 μm.

The subsequent densification steps can be carried out without shaping tools or supports.

In accordance with the invention, a second step of densifying the preform by CVI is then carried out to form a second phase of SiC matrix (step 50). This second densification step is carried out with a second gaseous SiC precursor different from the first precursor used in the first CVI densification step. The second SiC precursor forms an SiC deposit comprising residual hydrogen and free silicon.

This second SiC matrix precursor can comprise mainly or entirely monomethyl silane (MMS). MMS makes it possible to form an SiC deposit with a slight excess of silicon, typically between 2% and 5% by mass, compared to stoichiometry and having a residual hydrogen fraction. This SiC matrix precursor has kinetics and an infiltration capacity greater than those of the MTS precursor used during the first densification step.

The second densification step can also be carried out with other SiC precursors capable of forming residual hydrogen and free silicon. It is possible, for example, to use a mixture of silane ($SiH_4$) and a hydrocarbon such as ethane ($C_2H_6$) or propane ($C_3H_8$) or ethylene ($C_2H_4$).

This second step of densification with MMS makes it possible to obtain a preform that is better densified compared to a single step of CVI densification performed with MTS. In fact, as explained below in detail, during the rise in temperature, the second phase of the SiC matrix from the MMS will fragment to form a network of a multitude of interconnected cracks that promotes diffusion of molten silicon in the third densification step, thus obtaining a very low final degree of porosity (less than or equal to 2%).

The attack of SiC fibers by molten silicon is further limited by the presence of the first matrix phase of MTS which does not crack under the effect of temperature.

The degree of porosity of the preform after the second step of CVI densification with MMS can be reduced to 7% or even 5%, depending on the thickness of the second phase of SiC matrix deposited, while the minimum degree of porosity that can be obtained with a CVI densification carried out solely with MTS is 12%, or even 10%.

Thus, the second densification step is carried out until the preform has a porosity comprised between 5% and 10%.

The parameter(s) of the CVI process, essentially the temperature and/or the pressure, are adjusted according to the nature of the second precursor used to form an SiC deposit with residual hydrogen and free silicon. In the example described here, the MMS precursor is used, which contains carbon, silicon and hydrogen, unlike the MTS precursor. MMS is a very reactive precursor which must be used at a temperature and a pressure much lower than MTS if it is desired to have kinetics compatible with good infiltration. Typically, the deposition temperature with MMS is preferentially comprised between 700° C. and 800° C. and the pressure is around one millibar. This temperature is low enough for the hydrogen included in the molecule to be incorporated with the silicon and carbon in the deposit. From 850° C. and above, we start to find SiC deposit from MMS without hydrogen with insufficient infiltration ability.

The SiC deposit obtained from the second precursor corresponds to an SiC deposit which is usually considered imperfect because it is normally desired to avoid introducing species other than SiC into the deposit and, in particular, species capable of weakening SiC such as hydrogen. Deposits that are not stable and crack are usually rejected by material designers.

On the contrary, in the present invention, MMS or any other precursor capable of forming SiC, residual hydrogen and free silicon are used with operating conditions allowing these species to be preserved in the SiC deposit to obtain a cracking effect which will facilitate wetting by molten silicon or an alloy thereof.

The parameters of the CVI process, especially temperature and pressure in the furnace, and the composition of the reaction gas phase precursor of the SiC matrix material, are also chosen to control deposition kinetics in order to promote diffusion of the gas phase into the core of the preform and avoid a significant deposition thickness gradient in the thickness of the preform. The deposition kinetics, for given parameters of the CVI process, can be easily determined by experiment, by measuring the thickness of a deposit formed on the surface of a control part, for example a monolithic SiC block, as a function of the duration of the deposition phase. It can also be measured by finding the ratio between the deposition thickness, measured by optical microscopy or scanning electron microscopy on a polished cross-section, and the duration of the deposition phase.

The production of SiC deposits by CVI is known. Reference can especially be made to documents U.S. Pat. Nos. 5,246,736, 5,738,951, 5,965,266, 6,068,930 and 6,284,358.

Optionally, the preform can be machined after the second densification step in a step 60. This machining comprises at least one trimming or peeling of the preform to reopen the porosity of the this preform and facilitate access to the porosity of the preform by the molten silicon during the third densification step.

In step 70, the third step of densifying the fibrous preform is carried out by impregnating it with silicon or a silicon-based composition in the molten state corresponding to the well-known melt infiltration (MI) process. Specifically, the preform is heated while in contact with a source of molten metallic silicon or a molten silicon-containing alloy. The molten silicon easily wets the silicon carbide present in the preform, which greatly facilitates its penetration into the pores of the preform by capillary action.

When the temperature rises to the melting temperature of the silicon composition necessary for impregnation of the preform, the second phase of SiC matrix from the MMS precursor releases hydrogen and possibly free silicon because the second phase of SiC is brought to a temperature much higher than its production temperature. These releases of hydrogen and free silicon lead to a contraction of the SiC of this second matrix phase which fragments into small blocks which thus create a network of interconnected cracks. FIGS. 2 and 3 show the fragmentation presented by an SiC matrix phase obtained from an MMS precursor and the network of interconnected cracks thus created. This network favors the final densification by the silicon composition until a final degree of porosity of less than or equal to 2% is reached.

The final porosity content as well as the porosity content obtained during manufacture indicated above can especially be evaluated according to method B of European standard EN 1389-2004 which corresponds to a method for determining the density and the open porosity by displacement of liquid. Specifically, this method involves weighing a test specimen under the following three conditions:

(a) dry test specimen in air,
(b) test specimen immersed in a liquid that has been impregnated under vacuum;
(c) test specimen in air while still impregnated with the liquid.

The density and the open porosity can be determined by calculation from the weighing values a), b) and c).

The first SiC phase from MTS does not release species when the temperature rises during the step of impregnation by the silicon composition. This first SiC phase therefore retains its integrity (does not crack) and protects the fibers from attack by the molten silicon. FIG. 4 shows the appearance of an SiC matrix phase obtained from an MTS precursor and after heat treatment. It can be clearly seen that the matrix layer is not cracked.

A part made of SiC—SiC composite material is thus obtained which has very low porosity and free silicon ratios.

According to a particular characteristic of the method of the invention, it further comprises, after the second densification step and before the third densification step, a step of heat treating the partially densified preform at a temperature below the melting temperature of the infiltration composition. This heat treatment makes it possible to crack the second SiC matrix phase as explained above.

According to another particular characteristic of the method of the invention, it further comprises, between the first and second densification steps, the deposition on the first matrix phase of an interphase of boron nitride or pyrocarbon. This deposition advantageously relaxes the stresses exerted on the first SiC matrix phase during the cracking of the second SiC matrix phase during the heat treatment or the rise in temperature during the step of impregnation with molten silicon.

The CVI used in the second densification stage can be carried out under specified conditions capable of introducing hydrogen into the second matrix phase or with a third matrix precursor combined with the second matrix precursor, the third matrix precursor being capable of introducing hydrogen into the second matrix phase. The third precursor can especially be $CH_3SiH_3$ or MMS when it is not used as the second precursor.

Moreover, the manufacturing method of the invention is simpler to implement than that of the prior art because it does not involve injecting a slurry of SiC powder into the fibrous preform ("slurry cast" or "slurry transfer molding").

The first and second CVI densification steps can be carried out in sequence in the same CVI furnace, the reaction gas phase input(s) of the furnace being supplied successively with the first and second precursors.

Examples of implementation of a method of the invention are now described.

Example 1 production of an SiC multilayer fibrous texture based on Hi-Nicalon Type S fibers;
deposition of a BN/SiC interphase by CVI from $BCL_3$/$NH_3$/$H_2$ for BN and MTS/$H_2$ for SiC in shaper;
first phase deposition of SiC matrix by CVI without shaper from MTS/$H_2$ up to a degree of porosity comprised between 25% and 40%, preferably between 30 and 35%;
second SiC matrix deposition by CVI from MMS or MMS/$H_2$ up to a degree of porosity comprised between 5 and 10%;
high temperature heat treatment under vacuum at a temperature below the melting temperature of silicon between 1380° C. and 1400° C.;
impregnation with molten silicon from silicon at 1450° C.

In this example, the heat treatment and impregnation with molten silicon are carried out in the same cycle in the same furnace.

A part made of SiC/SiC composite material having a porosity of less than 2% is obtained.

Example 2 production of an SiC multilayer fibrous texture based on Hi-Nicalon Type S fibers;
deposition of a BN/SiC interphase by CVI from $BCL_3$/$NH_3$/$H_2$ for BN and MTS/$H_2$ for SiC in shaper;
first phase deposition of SiC matrix by CVI without shaper from MTS/$H_2$ up to a degree of porosity comprised between 25% and 40%, preferably between 30 and 35%;
second SiC matrix deposition by CVI from MMS or MMS/$H_2$ up to a degree of porosity comprised between 5 and 10%;
high temperature heat treatment under vacuum at a temperature above the melting temperature of silicon between 1450° C. and 1500° C.;
impregnation with molten silicon from silicon at 1450° C.

In this example, the heat treatment and impregnation with molten silicon are carried out in the same cycle in the same furnace.

A part made of SiC/SiC composite material having a porosity of less than 2% is obtained.

Example 3 production of an SiC multilayer fibrous texture based on Hi-Nicalon Type S fibers;
deposition of a BN/SiC interphase by CVI from $BCL_3$/$NH_3$/$H_2$ for BN and MTS/$H_2$ for SiC in shaper;
first phase deposition of SiC matrix by CVI without shaper from MTS/$H_2$ up to a degree of porosity comprised between 25% and 40%, preferably between 30 and 35%;
second SiC matrix deposition by CVI from MMS or MMS/$H_2$ up to a degree of porosity comprised between 5 and 10%;

machining at least the edges of the partially densified preform to reopen the porosity in the yarns, or of the entire preform to approximate the final shape of the part to be manufactured;

high temperature heat treatment under vacuum at a temperature below the melting temperature of silicon between 138° and 1400° C.;

impregnation with molten silicon from silicon at 1450° C.

In this example, the heat treatment and impregnation with molten silicon are carried out in the same cycle in the same furnace.

A part made of SiC/SiC composite material having a porosity of less than 2% is obtained.

The invention claimed is:

1. A method for manufacturing a part of SiC/SiC composite material comprising:
    production of a fibrous preform from silicon carbide fibers;
    deposition of an interphase on the fibers of the fibrous preform;
    a first densification step comprising a formation of a first matrix phase by chemical vapor infiltration with a first SiC precursor comprising methyltrichlorosilane (MTS) to obtain a first partially densified preform;
    a second densification step comprising a formation of a second matrix phase by chemical vapor infiltration with a second SiC precursor different from said first precursor, the second precursor forming a SiC deposit comprising residual hydrogen and free silicon to obtain a second partially densified preform;
    a third densification step comprising an impregnation of the fibrous preform with an impregnation composition containing at least silicon so as to obtain a part made of SiC/SiC composite material,
    wherein the first densification step comprises a first sub-step wherein a portion of the first matrix phase is formed with the fibrous preform held in a shaping tool and a second sub-step wherein the remainder of the first phase is formed with the fibrous preform outside the shaping tool.

2. The method according to claim 1, wherein the second SiC precursor comprises monomethyl silane (MMS) or a mixture of silane ($SiH_4$) and ethane ($C_2H_6$) or propane ($C_3H_8$) or ethylene ($C_2H_4$).

3. The method according to claim 1, wherein the first densification step is carried out until the first partially densified preform has a porosity comprised between 25% and 40%.

4. The method according to claim 3, wherein the second densification step is carried out until the second partially densified preform has a porosity comprised between 5% and 10%.

5. A method for manufacturing a part of SiC/SiC composite material comprising:
    production of a fibrous preform from silicon carbide fibers;
    deposition of an interphase on the fibers of the fibrous preform;
    a first densification step comprising a formation of a first matrix phase by chemical vapor infiltration with a first SiC precursor comprising methyltrichlorosilane (MTS);
    a second densification step to obtain a partially densified preform comprising a formation of a second matrix phase by chemical vapor infiltration with a second SiC precursor different from said first precursor, the second precursor forming a SiC deposit comprising residual hydrogen and free silicon;
    a third densification step comprising an impregnation of the fibrous preform with an impregnation composition containing at least silicon so as to obtain a part made of SiC/SiC composite material, wherein the method further comprises comprising, after the second densification step and before the third densification step, a step of heat treating the partially densified preform at a temperature below a melting temperature of an infiltration composition.

6. A method for manufacturing a part of SiC/SiC composite material comprising:
    production of a fibrous preform from silicon carbide fibers;
    deposition of an interphase on the fibers of the fibrous preform;
    a first densification step comprising a formation of a first matrix phase by chemical vapor infiltration with a first SiC precursor comprising methyltrichlorosilane (MTS):
    a second densification step to obtain a partially densified preform comprising a formation of a second matrix phase by chemical vapor infiltration with a second SiC precursor different from said first precursor, the second precursor forming a SiC deposit comprising residual hydrogen and free silicon;
    a third densification step comprising an impregnation of the fibrous preform with an impregnation composition containing at least silicon so as to obtain a part made of SiC/SiC composite material;
    wherein the method further comprises comprising, after the second densification step and before the third densification step, machining a surface of the partially densified preform so as to reopen a porosity of the preform.

7. A method for manufacturing a part of SiC/SiC composite material comprising:
    production of a fibrous preform from silicon carbide fibers;
    deposition of an interphase on the fibers of the fibrous preform;
    a first densification step comprising a formation of a first matrix phase by chemical vapor infiltration with a first SiC precursor comprising methyltrichlorosilane MTS);
    a second densification step comprising a formation of a second matrix phase by chemical vapor infiltration with a second SiC precursor different from said first precursor, the second precursor forming a SiC deposit comprising residual hydrogen and free silicon;
    a third densification step comprising an impregnation of the fibrous preform with an impregnation composition containing at least silicon so as to obtain a part made of SiC/SiC composite material,
    wherein the method further comprises, between the first and second densification steps, a deposition on the first matrix phase of an interphase of boron nitride or pyrocarbon.

8. A method for manufacturing a part of SiC/SiC composite material comprising:
    production of a fibrous preform from silicon carbide fibers;
    deposition of an interphase on the fibers of the fibrous preform;

a first densification step comprising a formation of a first matrix phase by chemical vapor infiltration with a first SiC precursor comprising methyltrichlorosilane (MTS);

a second densification step comprising a formation of a second matrix phase by chemical vapor infiltration with a second SiC precursor different from said first precursor, the second precursor forming a SiC deposit comprising residual hydrogen and free silicon;

a third densification step comprising an impregnation of the fibrous preform with an impregnation composition containing at least silicon so as to obtain a part made of SiC/SiC composite material, wherein the second densification step is carried out with a third matrix precursor combined with the second matrix precursor, the third matrix precursor being capable of introducing hydrogen into the second matrix phase.

9. A method comprising manufacturing a blade, a nozzle, a ring of a turbine or a gas turbine combustion chamber, the manufacturing comprising carrying out the method according to claim 1.

10. The method according to claim 4, wherein the first densification step is carried out until the first partially densified preform has a porosity comprised between 30% and 35%.

* * * * *